United States Patent [19]

Scholl et al.

[11] Patent Number: 5,130,363
[45] Date of Patent: Jul. 14, 1992

[54] RUBBER VULCANIZATES HAVING IMPROVED HYSTERESIS BEHAVIOR

[75] Inventors: Thomas Scholl, Meerbusch; Hans-Wilhelm Engels, Kerpen; Ulrich Eisele, Leverkusen; Ulrich Eholzer, Cologne, all of Fed. Rep. of Germany

[73] Assignee: Bayer Aktiengesellschaft, Leverkusen, Fed. Rep. of Germany

[21] Appl. No.: 793,467

[22] Filed: Nov. 18, 1991

[30] Foreign Application Priority Data

Nov. 29, 1990 [DE] Fed. Rep. of Germany ....... 4038000

[51] Int. Cl.$^5$ ............................................... C08K 5/37
[52] U.S. Cl. ..................................... 524/392; 525/343
[58] Field of Search ......................... 524/392; 525/343

[56] References Cited

U.S. PATENT DOCUMENTS

| | | | |
|---|---|---|---|
| 3,354,131 | 11/1967 | Trivette et al. | 524/392 |
| 3,417,039 | 12/1968 | Penneck | 524/392 |
| 4,303,765 | 12/1981 | Musch et al. | 525/343 |
| 4,670,493 | 6/1987 | Van Asbroeck et al. | 524/392 |
| 4,873,005 | 10/1989 | Hyde | 524/392 |

FOREIGN PATENT DOCUMENTS 0142707  5/1985  European Pat. Off. .

Primary Examiner—Paul R. Michl
Assistant Examiner—Olga Asinovsky
Attorney, Agent, or Firm—Connolly & Hutz

[57] ABSTRACT

The rubber vulcanizates according to the invention, which are produced using certain carboxyalkyl oligosulfides, are distinguished by improved hysteresis behavior; their mechanical properties remain substantially unaffected.

3 Claims, No Drawings

RUBBER VULCANIZATES HAVING IMPROVED HYSTERESIS BEHAVIOR

This invention relates to rubber vulcanizates having improved hysteresis properties and a process for the production of the rubber vulcanizates.

In rubber technology, hysteresis losses are the losses of energy irreversebly converted into heat when the elastomer is subjected to dynamic stressing. Hysteresis losses are measured as the tan δ which is defined as the ratio of loss modulus to storage modulus, cf. for example DIN 53 513 and DIN 53 535. Any reduction in the tan δ in the applicationally important temperature/frequency or amplitude range leads, for example, to reduced heat buildup in elastomers. Tires may of rubber having a reduced hysteresis loss are distinguished by reduced rolling resistance and, hence, by lower fuel consumption of the vehicles fitted with them.

U.S. Pat. No. 4,690,695, for example, describes carbon-black-filled rubber vulcanizates which, by virtue of their content of nitrosoanilines, show a reduced heat buildup, i.e. a reduced hysteresis loss. EP 253 365 describes certain nitroamines which lead to comparable effects. However, on account of the danger of carcinogenic nitrosamines being formed by renitrosation, there is a need for rubber auxiliaries which are free from nitro and nitroso groups.

U.S. Pat. No. 4,761,446 describes rubber vulcanizates modified with certain benzimidazolines. U.S. Pat. No. 4,762,870 describes rubber vulcanizates modified with hydroxybenzimidazole oxides. U.S. Pat. No. 4,822,845 describes rubber vulcanizates modified with heterocyclic di-N-oxides. Although all three described rubber vulcanizates show improved hysteresis properties, such as lower heat buildup and a lower tan δ, the additive leads to considerable reductions in elongation at break and tensile strength in all three cases. For this reason, these modifiers have never been successfully adopted in practice. In addition, the last three modifiers mentioned are only effective in SBR (and, even then, only in solution SBR). EP 366 952 describes a process for the production of rubber vulcanizates having reduced hysteresis losses. However, the described hysteresis improvers cannot be used in natural rubber, which is so important for tires, because they drastically reduce the molecular weight of natural rubber (cf. U.S. Pat. No. 2,470,948).

It has now surprisingly been found that filled rubber vulcanizates to which certain carboxyalkyl oligosulfides have been added show reduced hysteresis losses, better elasticity and hardly any reductions in strength and elongation.

The present invention relates to rubber vulcanizates produced from at least one rubber, a crosslinking agent, a filler, optionally other rubber auxiliaries and at least one carboxyalkyl oligosulfide corresponding to the following formula $$R^1-(S)_r-R^2 \quad (I)$$

in which
$R^1$ and $R^2$ may be the same or different and represent a $C_{1-18}$ alkyl radical or $C_{5-18}$ cycloalkyl radical substituted 1 to 4 times by a carboxyl group or by a carboxylate group; in the case of a carboxylate group, the cation is an ammonium group, a $C_{1-18}$ mono-, di- or trialkyl ammonium or $C_{6-18}$ mono-, di- or triaryl ammonium or $C_{7-21}$ mono-, di- or trialkylaryl ammonium group or a mono- to tetravalent metal atom and
r is an integer of 3 to 6, in quantities of 0.1 to 10% by weight, based on rubber.

Preferred carboxyalkyl oligosulfides are compounds corresponding to formula (I) in which $R^1$ and $R^2$ have the same meanings and represent an aliphatic radical containing 2 to 6 carbon atoms. These compounds may be substituted 1 to 4 times by a carboxyl or carboxylate group. They are preferably substituted once or twice. The following carboxyalkyl oligosulfides are mentioned as examples:

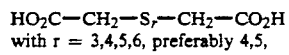
with r = 3,4,5,6, preferably 4,5,

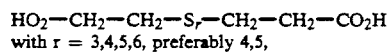
with r = 3,4,5,6, preferably 4,5,

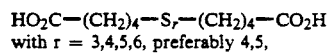
with r = 3,4,5,6, preferably 4,5,

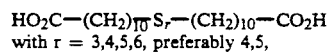
with r = 3,4,5,6, preferably 4,5,

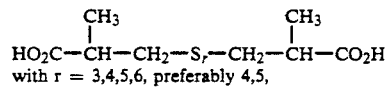
with r = 3,4,5,6, preferably 4,5,

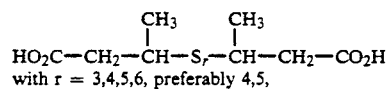
with r = 3,4,5,6, preferably 4,5,

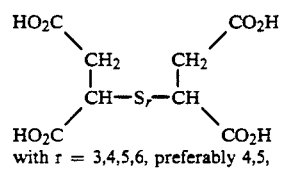
with r = 3,4,5,6, preferably 4,5,

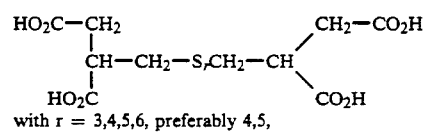
with r = 3,4,5,6, preferably 4,5,

In addition to the carboxyl compounds mentioned, the corresponding sodium, potassium, cobalt, iron, nickel, ammonium, magnesium, calcium, tin and/or zinc salts, preferably sodium, potassium, calcium, zinc, ammonium salts, may of course be used.

The following compounds of formula (I)

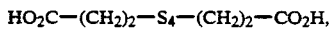

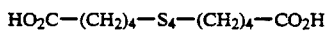

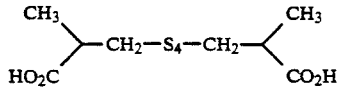

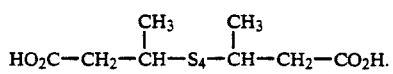

are particularly preferred.

The carboxyalkyl oligosulfides corresponding to formula (I) may be used both individually and also in admixture with one another.

The compounds corresponding to formula (I) may be produced by methods known per se, for example by reaction of carboxyalkyl halides with sodium polysulfides in accordance with reaction scheme A:

HO₂C-Alkyl-Hal+Na₂S→(I) (with r=2-7)+Na-Hal     A or by reaction of corresponding ω-mercaptoalkyl carboxylic acids with SCl₂ or S₂Cl₂ in accordance with reaction schemes B and C:

HO₂C-Alkyl-SH+SCl₂→(I) (with r=3)+HCl     B

HO₂C-Alkyl-SH+S₂Cl₂→(I) (with r=4)+HCl     C or, for example, by reaction of diorganodisulfides with SCl₂ in accordance with reaction scheme HO₂C-Alkyl-S-S-H+SCl₂→(I) (with r=5)+HCl     D The reaction of sodium polysulfides with alkyl halides in accordance with scheme A gives mixtures of different bis-(carboxyalkyl)-polysulfides because the sodium polysulfides are mixtures of different sulfides having the composition Na₂Sₓ (for carrying out the reactions in accordance with schemes A–D, see Houben-Weyl, Methoden der organischen Chemie, Vol. 9, pages 88 et seq (1955) and Vol. E 11 (1985), Thieme Verlag, Stuttgart).

Both natural rubber and synthetic rubbers may be used as rubbers for the rubber vulcanizates according to the invention, the synthetic rubbers containing at least 5% by weight copolymerized units emanating from a $C_{4-12}$ diene. Preferred synthetic rubbers are described, for example, in W. Hofmann, Kautschuktechnologie, Gentner-Verlag, Stuttgart, 1980, and include inter alia
BR—polybutadiene
ABR—butadiene/$C_{1-4}$ alkyl acrylate copolymers with acrylate contents of 5 to 60% by weight and preferably 5 to 50% by weight
CR—polychloroprene
IR—polyisoprene
SBR—styrene/butadiene copolymers having styrene contents of 1 to 60% by weight and preferably 10 to 50% by weight
NBR—butadiene/acrylonitrile copolymers having acrylonitrile contents of 5 to 60% by weight and preferably 10 to 50% by weight
and also mixtures of these rubbers. The rubbers preferably used have glass transition temperatures below 20.C and, more preferably below 0° C., as determined by the torsion pendulum test according to DIN 53 445. Particularly preferred rubbers are natural rubber, polybutadiene and styrene/butadiene copolymers.

The present invention also relates to a process for the production of rubber vulcanizates, characterized in that
(i) the unvulcanized rubber,
(i) 10 to 120% by weight and preferably 30 to 80% by weight, based on rubber (i), of carbon black and/or silica and
(iii) 0.1 to 10% by weight and preferably 0.1 to 3% by weight, based on rubber (i), of carboxyalkyl oligosulfides corresponding to formula (I)

$$R^1-(S)_r-R^2 \quad (I)$$

in which
$R^1$ and $R^2$ may be the same or different and represent a $C_{1-18}$ alkyl radical or $C_{5-18}$ cycloalkyl radical substituted 1 to 4 times by a carboxyl group or by a carboxylate group; in the case of a carboxylate group, the cation is an ammonium group, a $C_{1-18}$ mono-, di- or trialkyl ammonium or $C_{6-18}$ mono-, di- or triaryl ammonium or $C_{7-21}$ mono-, di-or tri- alkylaryl ammonium group or a mono- to tetravalent metal atom and
r is an integer of 3 to 6,
are mixed at melt temperatures of 120° to 200° C. and at shear rates of 1 to 1000 sec⁻¹, other vulcanization chemicals (crosslinking agents) and optionally other rubber auxiliaries are subsequently incorporated at temperatures below 120° C. and preferably at temperatures of 20° to 110° C. and the mixture is subsequently vulcanized at typical temperatures.

Any reinforcing carbon blacks may be used for the production of the rubber vulcanizates according to the invention having improved hysteresis properties. Preferred surfaces are from 35 to 200 m²/g (CTAB determination). SAF, HAF, FEF, ISAF and SRF carbon blacks are mentioned in particular. Mixtures of two or more different carbon blacks or mixtures of carbon blacks with silicas (with and without filler activators) may readily be used.

In addition, any reinforcing "silicate fillers" may be used for the production of the rubber vulcanizates according to the invention having improved hysteresis properties.

Highly disperse silicas (silicon dioxide) having specific BET surfaces of 5 to 1,000 m²/g and primary particle sizes of approximately 10 to 400 nm may be used as the "silicate fillers", as may synthetic and natural silicates and also glass fiber and glass fiber products (cf. DE 2 255 577). As already mentioned, the "silicate fillers" and carbon blacks may be used in admixture with one another and may be mixed in any ratios, depending in particular upon the particular application envisaged for the rubber vulcanizates.

For the process according to the invention, other rubber auxiliaries, such as plasticizers, resins, factices and stabilizers, may be added in typical quantities to the green compounds in order to obtain certain green compound and vulcanizate properties.

The crosslinking systems known from rubber technology, such as sulfur, peroxides, polyisocyanates, metal oxides, phenolic resins and combinations thereof, may be used for vulcanization. The crosslinking system used for vulcanization will preferably be adapted to the type of rubbers used. Sulfur crosslinking systems are particularly preferred.

Other additives, such as accelerators, retarders, etc., may be added in order to obtain optimal crosslinking kinetics.

The crosslinking systems (vulcanization chemicals) and rubber auxiliaries are incorporated at temperatures below 120° C. and preferably at temperatures of 20° to 110° C. Vulcanization may be carried out at temperatures of 100° to 200° C. and preferably at temperatures of 130° to 180° C., optionally under a pressure of 10 to 200 bar.

The rubber, the fillers and the carboxyalkyl oligosulfides of formula (I) according to the invention may be mixed in typical mixing units, for example on mixing rolls and in internal mixers and mixing extruders which generally operate with shear rates of 1 to 1,000 sec⁻¹ and preferably 1 to 200 sec⁻¹.

The rubber vulcanizates according to the invention may be processed to articles intended to withstand severe dynamic stressing, such as vehicle tires, conveyor belts, drive belts and air suspension linings.

EXAMPLE 1

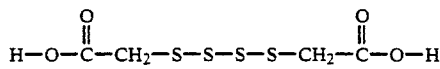

92 g (1.0 mol) thiodiglycolic acid are dissolved in 500 ml toluene and 67.5 g (0.5 mol) disulfur dichloride are added to the resulting solution at 5° C. while nitrogen is passed through. After heating to room temperature, the mixture is stirred for 8 hours. Filtration and drying leave approximately 110 g colorless crystals melting at 94° C.

EXAMPLE 2

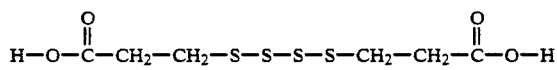

67.5 g (0.5 mol) disulfur dichloride are added at 5° C. to 106 g (1.0 mol) 3-mercaptopropionic acid in 500 ml toluene, followed by stirring for 8 hours at room temperature while nitrogen is passed through. Filtration and drying leave 133.5 g colorless crystals melting at 130°-133° C.

Elemental analysis: C: 26.3 (26.3), H: 3.5 (3.65), S: 46.2 (46.7).

Acid value: 407.

EXAMPLE 3

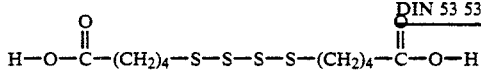

The procedure is as in Examples 1 and 2 using 67 g (0.5 mol) 5-mercaptopentanoic acid and 33.6 g (0.25 mol) disulfur dichloride. Colorless crystals melting at 86° C. are obtained in a yield of 79 g.

EXAMPLE 4

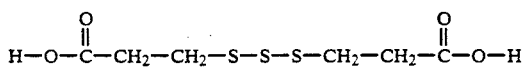

51 g (0.5 mol) sulfur dichloride are added at 5° C. to 106 g (1.0 mol) 3-mercaptopropionic acid in 500 ml toluene while nitrogen is passed through, followed by stirring for 8 hours at room temperature. Filtration and drying leave 124 g colorless crystals melting at 150° to 152° C.

EXAMPLE 5

Preparation of $O_2C-CH_2-S-S-S-S-CH_2-CO_2$ $Zn^{2+}$ 246 g (1.0 mol) of the compound of Example are dispersed in 1 toluene and 40.5 g (0.5 mol) zinc oxide are added to the resulting dispersion at room temperature, followed by stirring for 3 hours at 50° C. Filtration and drying leave 270 g colorless crystals melting at 110° C.

EXAMPLES 6-9

Production of the Vulcanizates

Rubber mixtures are prepared in a kneader at an internal temperature of 170° C. (rotational speed approx. 50 r.p.m.). The mixing time is 5 minutes.

| Mixture components: | |
|---|---|
| Natural rubber SMR 5/Defo 700 | 100 parts by weight |
| Carbon black N 339 (Degussa) | 55 parts by weight |
| Aromatic plasticizer[1] | 3.0 parts by weight |
| Zinc oxide | 5.0 parts by weight |
| Antiozonant wax[2] | 1.0 part by weight |
| N-isopropyl-N'-phenyl-p-phenylene-diamine[3] | 1.0 part by weight |
| Additive according to Examples 1-5 | 1.5 parts by weight |
| The mixtures are then mixed on a roll at 50° C. with | |
| Sulfur | 1.5 parts by weight |
| N-tert. butyl mercaptobenzthiazole sulfenamide[4] | 1.2 parts by weight |
| and vulcanized for 15 minutes at 140° C. | |

[1] ® Ingralen 450
[2] Ozonschutzwachs 111 (Rheinchemie)
[3] Vulkanox 4010 NA (Bayer)
[4] Vulkacit NZ (Bayer)

TABLE 1

| | Comparison No additive | Example 6 With comp. of Ex. 1 | Example 7 With comp. of Ex. 2 | Example 8 With comp. of Ex. 3 | Example 9 With comp. of Ex. 6 |
|---|---|---|---|---|---|
| Modulus 300 [MPa] | 18.8 | 19.5 | 21.0 | 19.5 | 19.0 |
| Strength [MPa] | 23.5 | 23.3 | 23.5 | 23.5 | 23.2 |
| Elongation [%] | 400 | 390 | 380 | 400 | 380 |
| Tear propagation resistance [n/mm] | 360 | 365 | 320 | 360 | 400 |
| Hardness [Shore A] | 72 | 72 | 74 | 75 | 70 |
| Elasticity [%] | 43 | 49 | 48 | 47 | 49 |
| Tan δ 20° C. DIN 53 535 | 0.146 | 0.120 | 0.117 | 0.125 | 0.114 |

EXAMPLES 10-11

Rubber mixtures were prepared in a kneader at an internal temperature of 170° C. (rotational speed approx. 50 r.p.m.). The mixing time is 5 minutes.

| Mixture components: | |
|---|---|
| Solution SBR (Buna SL 750) (oil-extended, oil content 27.3%) | 100 parts by weight |
| Carbon black N 339 (Degussa) | 85 parts by weight |
| Stearic acid | 1.5 parts by weight |
| Aromatic plasticizer[1] | 5.0 parts by weight |
| N-isopropyl-N'-phenyl-p-phenylene-diamine[3] | 1.5 part by weight |

-continued

| Mixture components: | |
|---|---|
| Zinc oxide | 3.0 parts by weight |
| Additive of Examples 1-5 | 1.5 parts by weight |
| The mixtures are then mixed on a roll at 50° C. with | |
| Sulfur | 1.2 parts by weight |
| N-tert. butyl mercaptobenzthiazole sulfenamide[4)] | 1.4 parts by weight |
| and vulcanized for 15 minutes at 150° C. | |

TABLE 2

| | Comparison No additive | Example 10 With comp. of Ex. 2 | Example 11 With comp. of Ex. 6 | Comparison 1.0 phrb US 4,822,845, Ex. H 65 |
|---|---|---|---|---|
| Modulus 300 [MPa] | 5.6 | 8.0 | 11.0 | Cannot be measured |
| Strength [MPa] | 19.8 | 19.0 | 17.8 | 15.0 |
| Elongation [%] | 500 | 420 | 470 | 280 |
| Tear propagation resistance [n/mm] | 215 | 180 | 205 | 135 |
| Hardness [Shore A] | 65 | 67 | 65 | 67 |
| Elasticity [%] | 36 | 40 | 38 | 39 |
| Tan δ 60° C. DIN 53 535 | 0.193 | 0.157 | 0.169 | 0.153 |

EXAMPLE 12

Rubber mixtures are prepared in a kneader at an internal temperature of 170° C. (rotational speed approx. 50 r.p.m.). Mixing time 5 minutes.

| Mixture components: | |
|---|---|
| SBR (Buna Huls 1712) | 137.5 parts by weight |
| Carbon black N 339 (Degussa) | 85 parts by weight |
| Zinc oxide | 3.0 parts by weight |
| Aromatic plasticizer[1)] | 5.0 parts by weight |
| N-isopropyl-N'-phenyl-p-phenylene-diamine[3)] | 1.5 part by weight |
| Stearic acid | 1.5 parts by weight |
| Additive of Examples 1-5 | 1.5 parts by weight |
| The mixtures are then mixed on a roll at 50° C. with | |
| Sulfur | 1.8 parts by weight |
| N-tert. butyl mercaptobenzthiazole sulfenamide[4)] | 1.2 parts by weight |
| and then vulcanized at 150° C. (15 minutes). | |

TABLE 3

| | Comparison No additive | Example 12 With comp. of Ex. 2 |
|---|---|---|
| Modulus 300 [MPa] | 11.2 | 15.9 |
| Strength [MPa] | 21.3 | 20.7 |
| Elongation [%] | 560 | 405 |
| Tear propagation resistance [n/mm] | 205 | 180 |
| Hardness [Shore A] | 64 | 68 |
| Elasticity [%] | 29 | 32 |
| Tan δ 100° C. DIN 53 535 | 0.138 | 0.109 |

We claim:

1. Rubber vulcanizates produced from at least one rubber, a crosslinking agent, a filler, optionally other rubber auxiliaries and at least one carboxyalkyl oligosulfide corresponding to the following formula $$R^1-(S)_r-R^2 \quad (I)$$

in which

R[1] and R[2] may be the same or different and represent a $C_{1-18}$ alkyl radical or $C_{5-18}$ cycloalkyl radical substituted 1 to 4 times by a carboxyl group or by a carboxylate group; in the case of a carboxylate group, the cation is an ammonium group, a $C_{1-18}$ mono-, di- or trialkyl ammonium or $C_{6-18}$ mono-, di- or triaryl ammonium or $C_{7-21}$ mono-, di- or trialkylaryl ammonium group or a mono- to tetravalent metal atom and r is an integer of 3 to 6, in quantities of 0.1 to 10% by weight, based on rubber.

2. A process for the production of rubber vulcanizates, characterized in that
   (i) the unvulcanized rubber,
   (ii) 10 to 120% by weight, based on rubber (i), of carbon black and/or silica and
   (iii) 0.1 to 10% by weight, based on rubber (i), of carboxyalkyl oligosulfides corresponding to formula (I)

$$R^1-(S)_r-R_2 \quad (I)$$

in which

R[1] and R[2] may be the same or different and represent a $C_{1-18}$ alkyl radical or $C_{5-18}$ cycloalkyl radical substituted 1 to 4 times by a carboxyl group or by a carboxylate group; in the case of a carboxylate group, the cation is an ammonium group, a $C_{1-18}$ mono-, di- or trialkyl ammonium or $C_{6-18}$ mono-, di- or triaryl ammonium or $C_{7-21}$ mono-, di-or trialkylaryl ammonium group or a mono- to tetravalent metal atom and r is an integer of 3 to 6, are mixed at melt temperatures of 120° to 200° C. and at shear rates of 1 to 1000 sec$^{-1}$, other vulcanization chemicals (crosslinking agents) and optionally other rubber auxiliaries are subsequently incorporated at temperatures below 120° C. and the mixture is subsequently vulcanized at typical temperatures.

3. Moldings of the vulcanizates claimed in claim 1.

* * * * *